United States Patent [19]
Mintz

[11] Patent Number: 5,267,632
[45] Date of Patent: Dec. 7, 1993

[54] FOLDING DEER STAND APPARATUS

[76] Inventor: Jeffrey F. Mintz, Rte. 1, Box 595, Delco, N.C. 28436

[21] Appl. No.: 941,713

[22] Filed: Sep. 8, 1992

[51] Int. Cl.⁵ .......................... A45F 3/26; A01M 31/02
[52] U.S. Cl. .................................. 182/116; 182/187; 182/129; 182/163
[58] Field of Search ............... 182/187, 188, 116, 163, 182/129

[56] References Cited

U.S. PATENT DOCUMENTS

| | | | |
|---|---|---|---|
| 3,282,372 | 11/1966 | Ray | 182/116 X |
| 3,517,772 | 6/1970 | Weis et al. | 182/163 |
| 4,614,252 | 9/1986 | Tarner | 182/187 X |
| 4,730,699 | 3/1988 | Threkeld | 182/187 |
| 4,742,888 | 5/1988 | Amacrer | 182/116 |
| 4,787,478 | 11/1989 | Lee | 182/116 |
| 5,064,020 | 11/1991 | Eaglesor | 182/187 X |
| 5,105,908 | 4/1992 | Freund | 182/187 X |

FOREIGN PATENT DOCUMENTS 46626  6/1917  Switzerland ........................ 182/163

Primary Examiner—Alvin C. Chin-Shue
Attorney, Agent, or Firm—Leon Gilden

[57] ABSTRACT

An apparatus including a plurality of sections arranged for interfolding relative to one another having a platform at an upper end of the sections and a support base at a lower end of the sections arranged for compact interfolding during periods of non-use and permitting extension for access to upper portions of a tree, to include an integral ladder and stand arrangement.

1 Claim, 4 Drawing Sheets

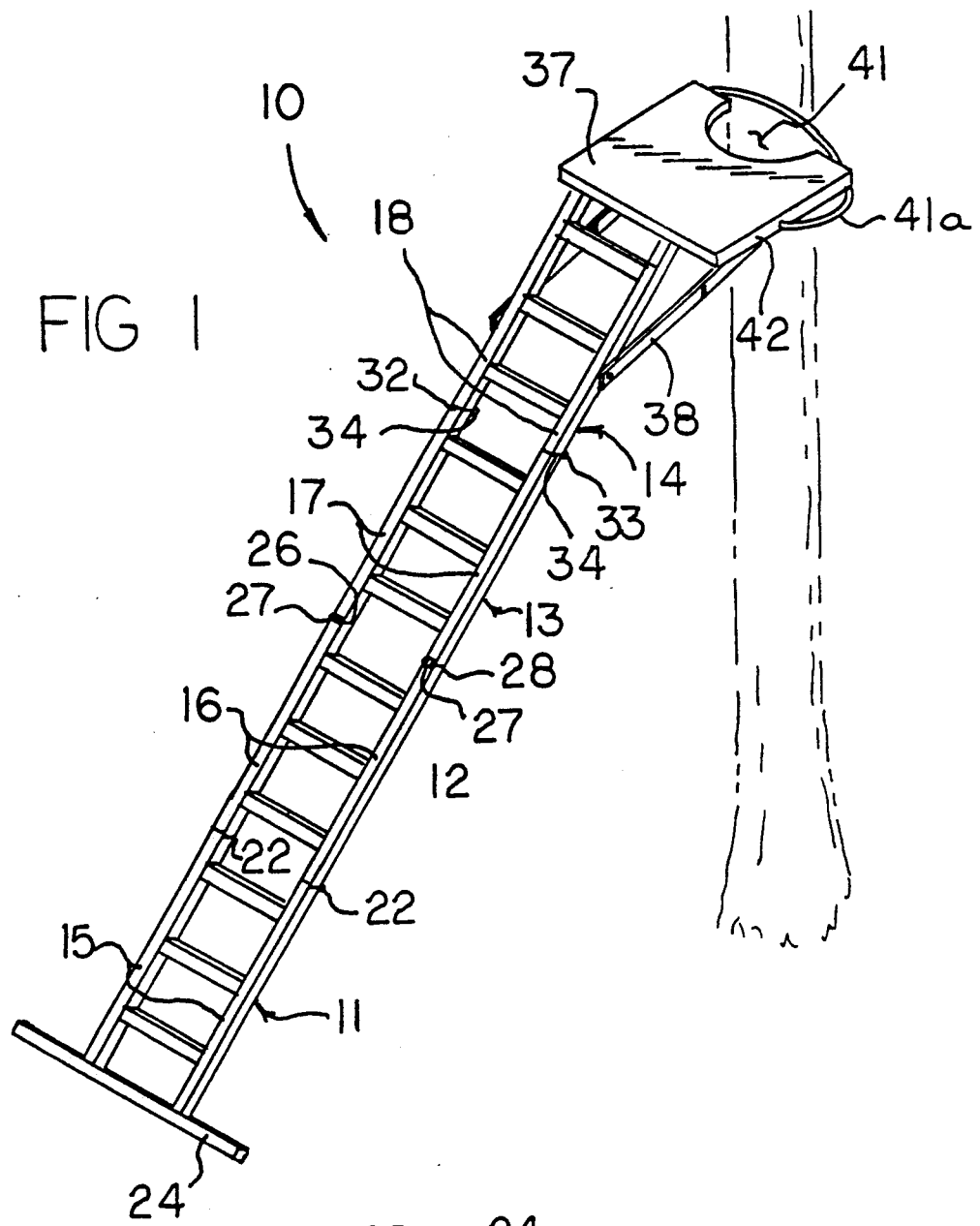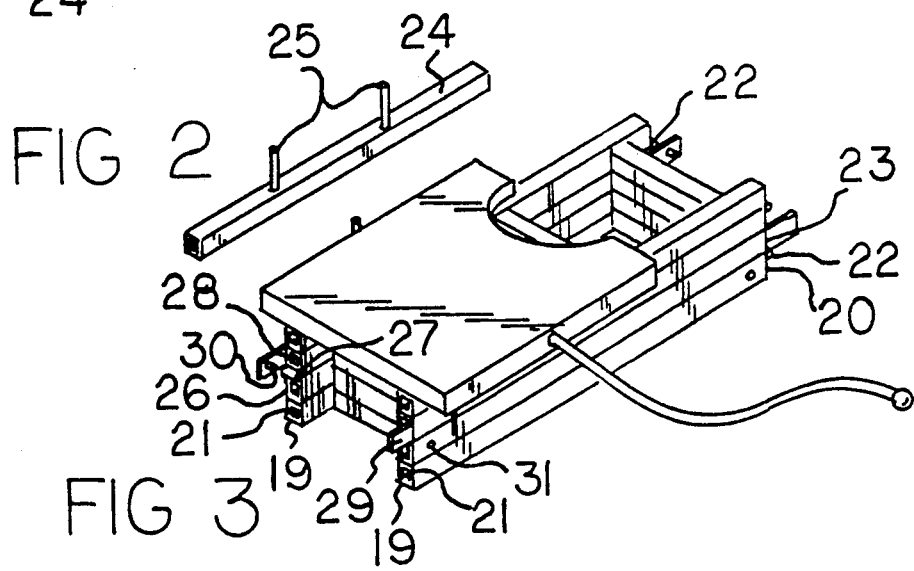

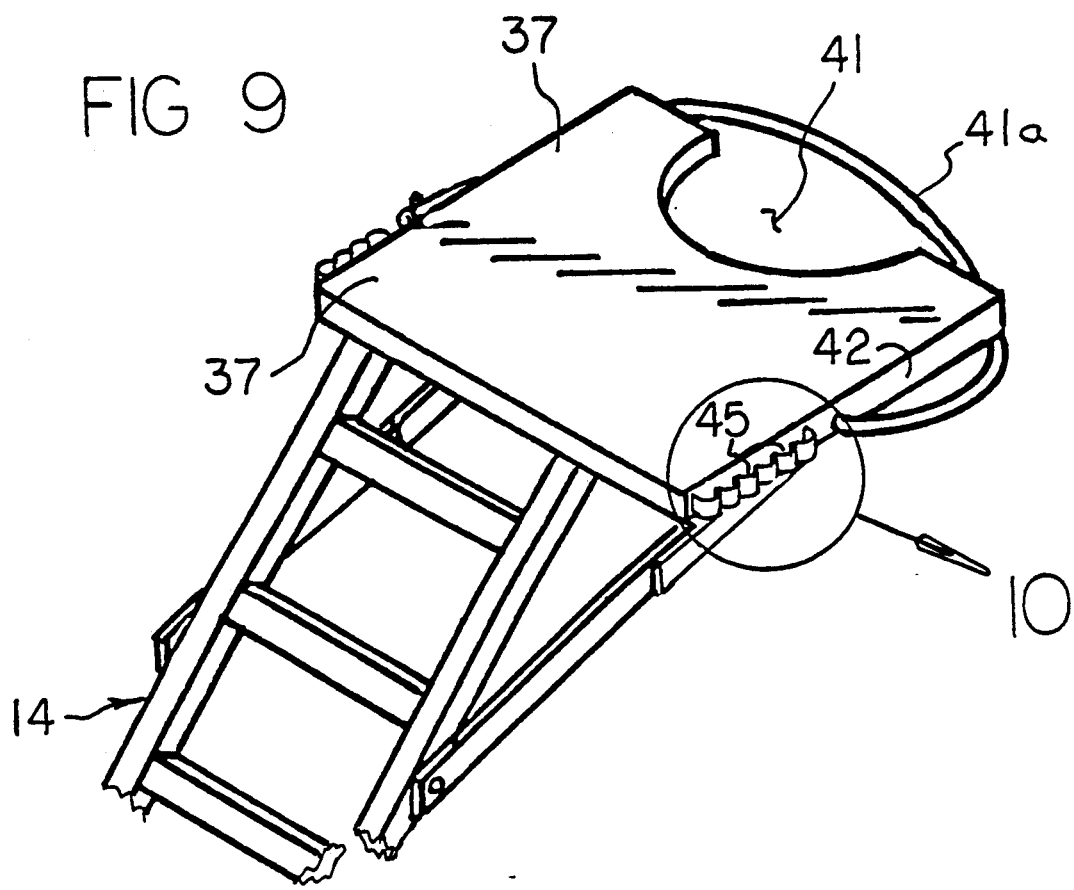
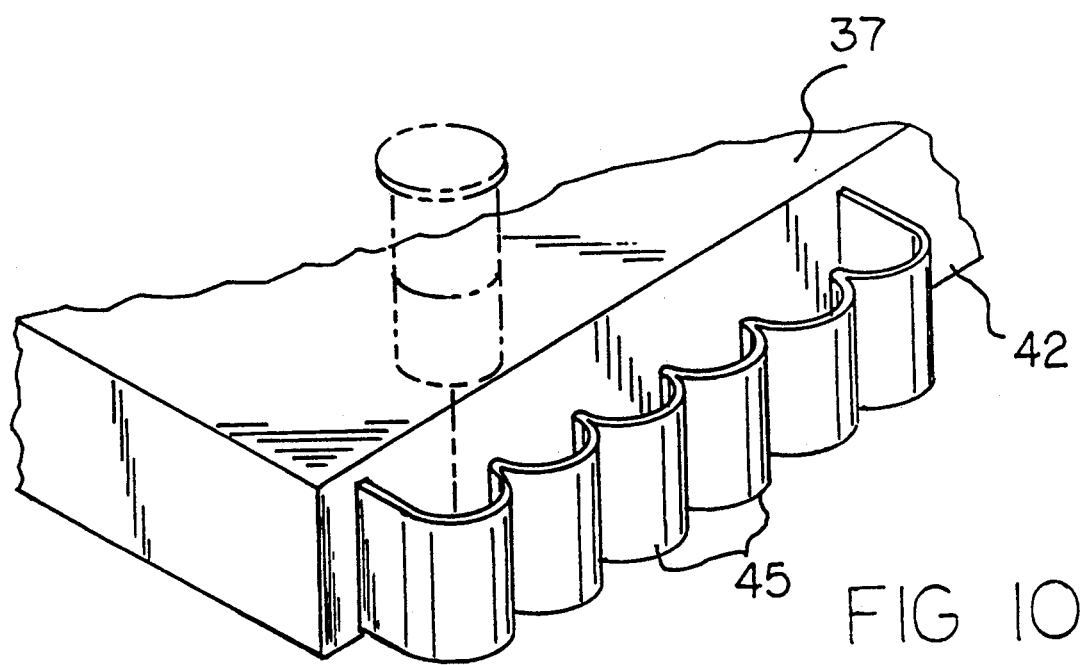

FOLDING DEER STAND APPARATUS

BACKGROUND OF THE INVENTION

1. Field of the Invention

The field of invention relates to deer stand apparatus, and more particularly pertains to a new and improved folding deer stand apparatus wherein the same is arranged for compact storage and transport during periods of non-use.

2. Description of the Prior Art

Deer stands of various types are utilized throughout the prior art to provide access to uppermost portions of trees, wherein integral ladder construction is set forth in the prior art and exemplified in U.S. Pat. No. 3,630,314 to Bamburg and U.S. Pat. No. 4,951,696 to Jones, Sr. wherein the same utilizes ladders mounted to trees, wherein the ladders are separable to ease of transport of the organizations.

The U.S. Pat. Nos. 4,727,961 and 4,549,635 set forth examples of folding hunting stand structure.

The prior art has heretofore failed to provide for an organization maintaining assemblage of the various components during interfolded relationship in a manner to permit their ease of storage and transport yet preventing loss of the various components and in this respect, the present invention substantially fulfills this need.

SUMMARY OF THE INVENTION

In view of the foregoing disadvantages inherent in the known types of deer stand apparatus now present in the prior art, the present invention provides a folding deer stand apparatus wherein the same is arranged for interfolding of an elongate ladder relative to a platform plate for positioning relative to an associated tree structure. As such, the general purpose of the present invention, which will be described subsequently in greater detail, is to provide a new and improved folding deer stand apparatus which has all the advantages of the prior art deer stand apparatus and none of the disadvantages.

To attain this, the present invention provides an apparatus including a plurality of sections arranged for interfolding relative to one another having a platform at an upper end of the sections and a support base at a lower end of the sections arranged for compact interfolding during periods of non-use and permitting extension for access to upper portions of a tree, to include an integral ladder and stand arrangement.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved folding deer stand apparatus which has all the advantages of the prior art deer stand apparatus and none of the disadvantages.

It is another object of the present invention to provide a new and improved folding deer stand apparatus which may be easily and efficiently manufactured and marketed.

It is a further object of the present invention to provide a new and improved folding deer stand apparatus which is of a durable and reliable construction.

An even further object of the present invention is to provide a new and improved folding deer stand apparatus which is susceptible of a low cost of manufacture with regard to both materials and labor, and which accordingly is then susceptible of low prices of sale to the consuming public, thereby making such folding deer stand apparatus economically available to the buying public.

Still yet another object of the present invention is to provide a new and improved folding deer stand apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an isometric illustration of the support bar of the invention.

FIG. 3 is an isometric illustration of the interfolded ladder structure.

FIG. 9 is an isometric illustration of the platform plate having cartridge receiving loops mounted to side walls thereof.

FIG. 10 is an isometric illustration of section 10 as set forth in FIG. 9.

DESCRIPTION OF THE PREFERRED EMBODIMENT

Figure 4:
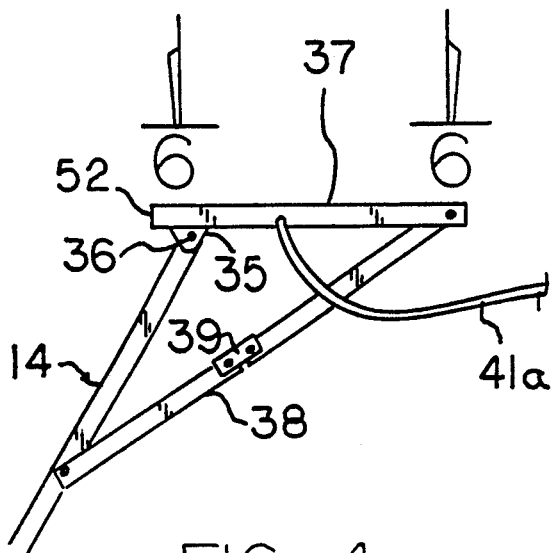
FIG. 4 is an orthographic side view of the platform plate and the uppermost portions thereof.
Figure 5:
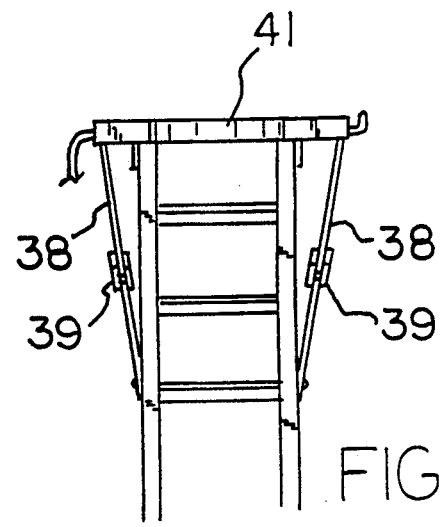
FIG. 5 is an orthographic rear view of the uppermost ladder section of the invention.
Figure 6:
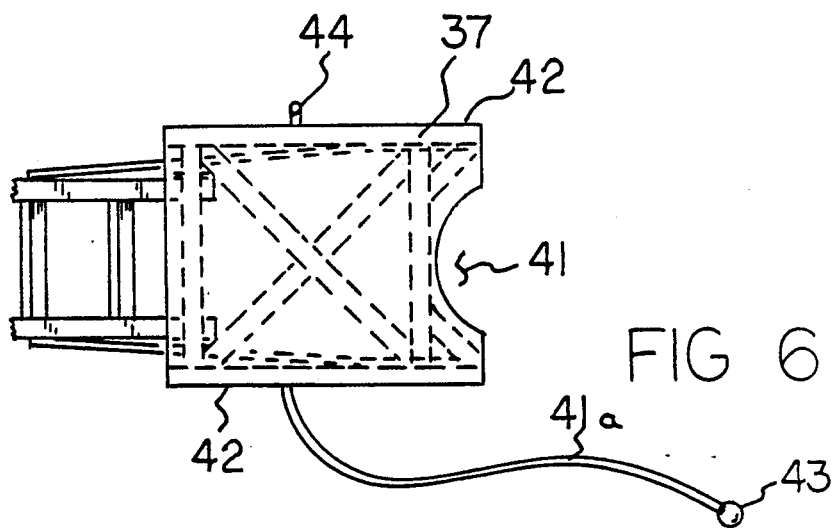
FIG. 6 is an orthographic view, taken along the lines 6—6 of FIG. 4 in the direction indicated by the arrows.

With reference now to the drawings, and in particular to FIGS. 1 to 12 thereof, a new and improved folding deer stand apparatus embodying the principles and concepts of the present invention and generally designated by the reference numeral 10 will be described.

Figures 7, 8:
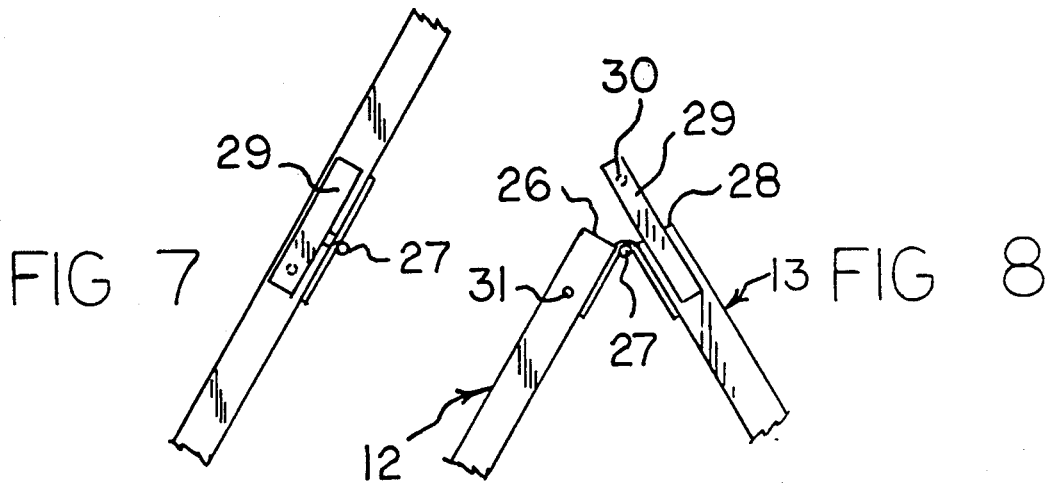
FIG. 7 is an orthographic side view of the second and third ladder sections in an interlocked configuration.
FIG. 8 is an orthographic side view of the second and third ladder sections in a released configuration relative to one another.

More specifically, the folding deer stand apparatus 10 of the instant invention essentially comprises first, second, third, and fourth ladder sections 11, 12, 13, and 14 arranged in interfolding and hinged relationship relative to one another for longitudinal alignment in a first position, as set forth in FIG. 1, and for an overlying interfolded relationship, as illustrated in FIG. 3, in a second position. The first through fourth ladder sections include respective first, second, third, and fourth ladder leg pairs 15, 16, 17, and 18 having interconnecting rungs fixedly mounted therebetween. The first ladder leg pair 15 includes first ladder leg pair first ends 19 spaced from first ladder leg pair second ends 20. The first ladder leg pair first ends 19 include pin receiving bores 21 to receive support bar pins 25 of an associated support bar 24 to provide stability to the organization when the support bar 24 is mounted to the first leg pair first ends 19. The first leg pair second ends 20 of the first ladder leg pair 15 includes a first hinge 22 cooperative with the second ladder leg pair first ends 23. Second ladder leg pair second ends 26 each include a second hinge 27 securing the second leg pair second ends 26 to the third leg pair first ends 28. Reference to the FIGS. 7 and 8 illustrate a spring plate 29 mounted to the third leg pair projecting beyond the third leg pair first ends 28 and arranged to include a spring plate rod 30 fixedly mounted in an orthogonal relationship relative to the spring plate 29 as it projects beyond the third leg pair first end 28 to permit reception of the rod 30 into an associated receiving bore 31 directed orthogonally into the second leg pairs 16 adjacent the second leg pair second ends 36 to interlock the second and third ladder leg sections together. The third leg pair second ends 32 each include a third hinge 33 to secure them to fourth leg pair first ends 34. The fourth leg pairs 18 include fourth leg pair second ends 35 having fourth hinges 36 to pivotally mount the fourth leg pair second ends 35 relative to a platform front edge 52. Articulated linkage 38 is directed from the platform plate sides 42 downwardly to each ladder leg of the fourth ladder leg pairs 18 intermediate the third ladder leg pair ends, wherein the articulated linkage 38 includes a lock member 39 to permit fixed securement of the articulate linkage 38 between the platform 37 and the fourth ladder leg pairs 18.

The platform 37 includes a platform rear edge 40 having a concave recess 41. A strap member 41a extending between the sides 42 of the platform extends in surrounding relationship relative to the concave recess 41 to provide for encirclement of an associated tree, as illustrated in FIG. 1, that is received within the recess 41. The strap member 41a includes a strap locking loop 43 at its free distal end for reception upon a strap L-shaped loop receiving finger 44 mounted to one of the platform sides 42.

The FIGS. 9 and 10 illustrate the additional use of plural rows of loop members 45 mounted to the sides 42 to receive cartridge shells therewithin for storage of such shells.

Figure 11:
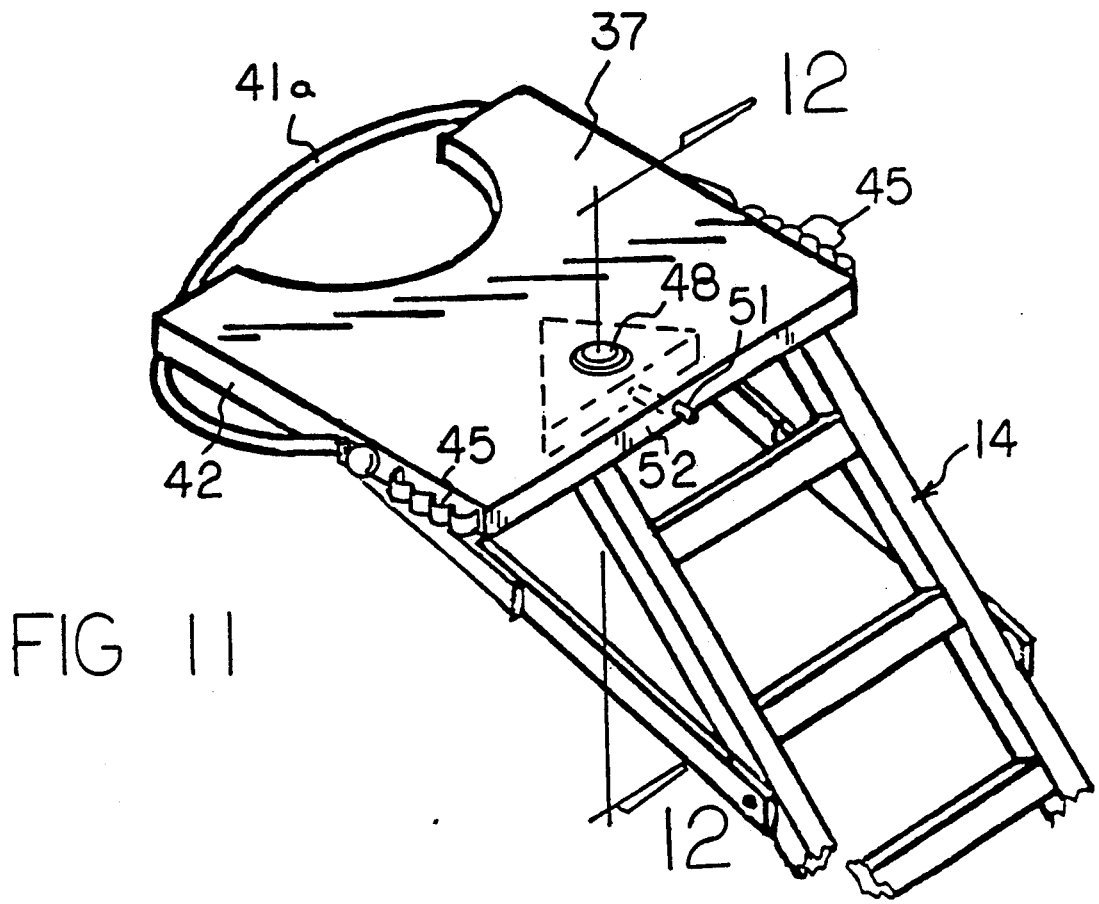
FIG. 11 is an isometric illustration of the modified platform plate structure.
Figure 12:
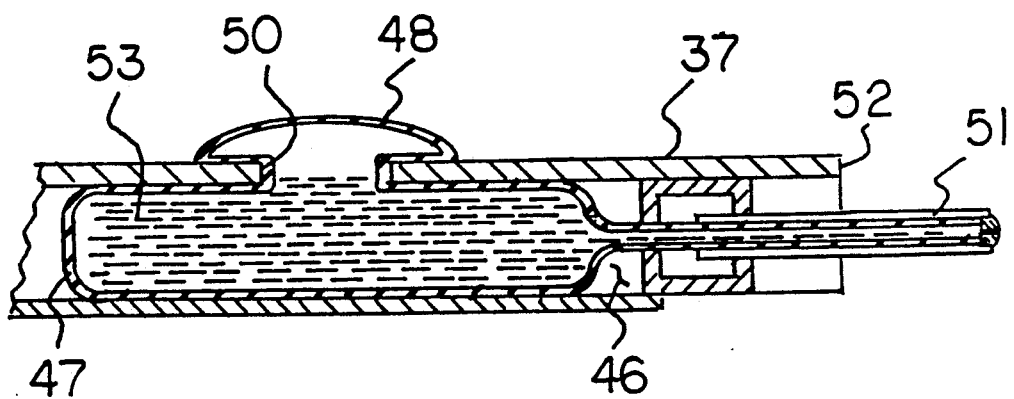
FIG. 12 is an orthographic view, taken along the lines 12—12 of FIG. 11 in the direction indicated by the arrows.

Further, the platform 37 as illustrated in FIGS. 11 and 12 is arranged to include a fluid reservoir 47 positioned within a platform cavity 46 adjacent the platform front edge 52. A resilient bulb 48 projects through a platform top wall opening 50 and upon depressing resilient bulb 48 projects a deer scent attractant 53 from within the reservoir and projects such fluid through an associated nozzle 51 that is directed through the platform front edge 52 to effect spraying of a surrounding area of the platform plate to effect attracting and simultaneous camouflaging of an individual mounted and positioned upon the platform plate 37.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A folding deer stand apparatus, comprising,
   a plurality of ladder sections, including at least a first ladder section, a second ladder section, and a last ladder section, wherein the first ladder section, the second ladder section, and the last ladder section are arranged in a longitudinally aligned relationship in a first orientation and arranged in an interfolded orientation in a second configuration, the first ladder section including a first ladder leg pair, the second ladder section including a second ladder leg pair, and the last ladder section including a last ladder leg pair, and
   the last ladder leg pair including a platform plate hingedly mounted to the last ladder section, including a plurality of platform hinges hingedly mounting the last ladder leg section to the platform plate, and the first ladder section and the second ladder section including first hinge members interconnecting the first ladder section to the second ladder section, and the second ladder section and the last ladder section include further hinge members interconnected between the second ladder section and the last ladder section, and wherein the first ladder section includes first ladder leg pairs, wherein the first ladder leg pairs include first ladder leg pair lower ends, and the lower end each include a pin receiving bore therewithin, and a support bar, the support bar including a plurality of pins, and each of said pins is arranged for reception within one of said pin receiving bores, and the second ladder section includes spring plates mounted to the second ladder section, and the last ladder section includes rod receiving bores, wherein each spring plate includes a rod fixedly mounted to the spring plate in a spaced orientation relative to the second ladder section, and each rod is arranged for reception with one of said rod receiving bores, and the platform plate includes a forward edge and a rear edge, and the rear edge includes a concave recess, and the platform plate includes spaced side walls, and one of said side walls includes a strap member mounted thereof arranged for projection about the rear edge, and a further one of said side walls includes an L-shaped finger member and the strap includes a strap locking loop arranged for reception on said finger member, and each of said side walls includes a plurality of loop members receiving ammunition therewithin, and the platform plate includes a plate top wall and a plate bottom wall, and a reservoir mounted within the platform plate between the top wall and the bottom wall, and a nozzle projecting from the platform plate forwardly of the forward edge of the platform plate, and a top wall opening directed through the top wall, and a resilient bulb directed through the top wall opening in communication with the fluid reservoir, whereupon depressing of the resilient bulb effects projection of fluid from said reservoir through the nozzle.

* * * * *